US012210307B2

(12) United States Patent
Watanabe et al.

(10) Patent No.: US 12,210,307 B2
(45) Date of Patent: Jan. 28, 2025

(54) IMAGE FORMING APPARATUS

(71) Applicant: CANON KABUSHIKI KAISHA, Tokyo (JP)

(72) Inventors: Takanori Watanabe, Kanagawa (JP); Takashi Narahara, Shizuoka (JP); Yutaka Sato, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/483,402

(22) Filed: Oct. 9, 2023

(65) Prior Publication Data

US 2024/0126198 A1 Apr. 18, 2024

(30) Foreign Application Priority Data

Oct. 12, 2022 (JP) ................................ 2022-163766

(51) Int. Cl.
*G03G 15/00* (2006.01)

(52) U.S. Cl.
CPC ................................ *G03G 15/5029* (2013.01)

(58) Field of Classification Search
USPC ........................................................... 399/45
See application file for complete search history.

(56) References Cited

U.S. PATENT DOCUMENTS 5,289,247 A * 2/1994 Takano .............. G03G 15/2039 399/68
2021/0405567 A1* 12/2021 Takayama .......... G03G 15/2064

FOREIGN PATENT DOCUMENTS

JP 2000272781 A 10/2000

* cited by examiner

*Primary Examiner* — Quana Grainger
(74) *Attorney, Agent, or Firm* — Canon U.S.A., Inc. IP Division

(57) ABSTRACT

An image forming apparatus includes a feed tray, first and second sensors, and a controller. The controller adjusts a sheet interval between the first and second recording materials based on sensor detected length and width of a recording material fed from the feed tray. When a first recording material has a first length and a second recording material has a second length longer than the first length, the controller performs control to increase a sheet interval in response to a first number of recording materials having the second length and conveyed successively. When the first recording material has the first length and the second recording material has a third length shorter than the first length, the controller performs control to reduce the sheet interval in response to a second number of recording materials having the third length and conveyed successively. The second number is greater than the first number.

13 Claims, 6 Drawing Sheets

IMAGE FORMING APPARATUS

BACKGROUND

Field

The present disclosure relates to an image forming apparatus that uses an electrophotographic process.

Description of the Related Art

A known image forming apparatus allows various recording materials having different lengths in a conveying direction and different widths in a direction perpendicular to the conveying direction to pass therethrough. The recording materials can be fed from a sheet feeding cassette, from which recording materials having a predetermined size can be fed, and can also be fed from a multi-purpose tray (hereinafter, also referred to as an MP tray), from which recording materials having any size selected or designated by a user can be fed. When a recording material is fed from the sheet feeding cassette, the image forming apparatus forms an image on the recording material in a fixing mode that depends on the size of the recording material having the predetermined size. When a recording material is fed from the MP tray, the image forming apparatus forms an image on the recording material in a fixing mode that depends on the size of the recording material designated by the user through a host computer connected to the image forming apparatus because the apparatus cannot determine the size of the recording materials placed on the tray.

Particularly narrow recording materials (hereinafter, also referred to as narrow sheets), such as envelopes, may successively pass through the image forming apparatus. In such a case, a difference in heat consumption between a recording-material passing portion and a non-recording-material-passing portion in a fixing device causes a temperature rise in the non-recording-material-passing portion (hereinafter, "a temperature rise in a non-sheet-passing portion"). A temperature rise in the non-sheet-passing portion may cause the following phenomena: uneven thermal expansion of a pressure roller, which promotes deterioration of rubber in the non-sheet-passing portion; a variation in film feed rate in a film heating type heating device, which results in a local change in conveyance speed of a recording material and in turn causes paper wrinkles; and hot offset resulting from excessive melting of toner due to a high-temperature area that is located in a wide recording material, such as an A4-size sheet, passing and following a narrow sheet and that corresponds to the non-sheet-passing portion associated with the narrow sheet.

In consideration of such issues, when a narrow sheet is caused to pass through the image forming apparatus, a sheet interval, serving as a feeding interval, between recording materials is increased to reduce throughput, thus reducing a temperature rise in the non-sheet-passing portion. In this case, as a recording material is longer, the non-sheet-passing portion is heated for a longer time period and to a higher temperature. Therefore, the sheet interval is increased depending on the length of a narrow sheet. Japanese Patent Laid-Open No. 2000-272781 discloses that a sensor detects a length of the first fed recording material and a sheet interval is determined based on the detected size of the recording material.

SUMMARY

When recording materials having different lengths are caused to pass through the image forming apparatus, the sheet interval can be adjusted depending on the length of a recording material.

The present disclosure provides a control unit configured to adjust a sheet interval depending on the length of a recording material when recording materials having different lengths are conveyed.

According to an aspect of the present disclosure, an image forming apparatus includes a feed tray on which recording materials are to be stacked and from which the stacked recording materials are to be fed, a first sensor configured to detect a length of a recording material fed from the feed tray in a conveying direction, a second sensor configured to detect a width of the fed recording material in a direction perpendicular to the conveying direction, and a controller configured to perform control to adjust a sheet interval based on the detected length and width, wherein the sheet interval is a distance between a first recording material and a second recording material and the first recording material precedes the second recording material and the second recording material succeeds the first recording material, wherein, when the first recording material has a first length and the second recording material has a second length longer than the first length, the controller performs control to increase the sheet interval in response to a first number of recording materials having the second length and conveyed successively, and wherein, when the first recording material has the first length and the second recording material has a third length shorter than the first length, the controller performs control to reduce the sheet interval in response to a second number of recording materials having the third length and conveyed successively, where the second number is greater than the first number.

Further features of the present disclosure will become apparent from the following description of exemplary embodiments with reference to the attached drawings.

DESCRIPTION OF THE EMBODIMENTS

Exemplary embodiments of the present disclosure will be described below with reference to the drawings. The following embodiments are not intended to limit the present disclosure described in the appended claims. All of the combinations of features described in the embodiments are not necessary in accordance with an embodiment of the present disclosure.

First Embodiment

Image Forming Apparatus

Figure 1:
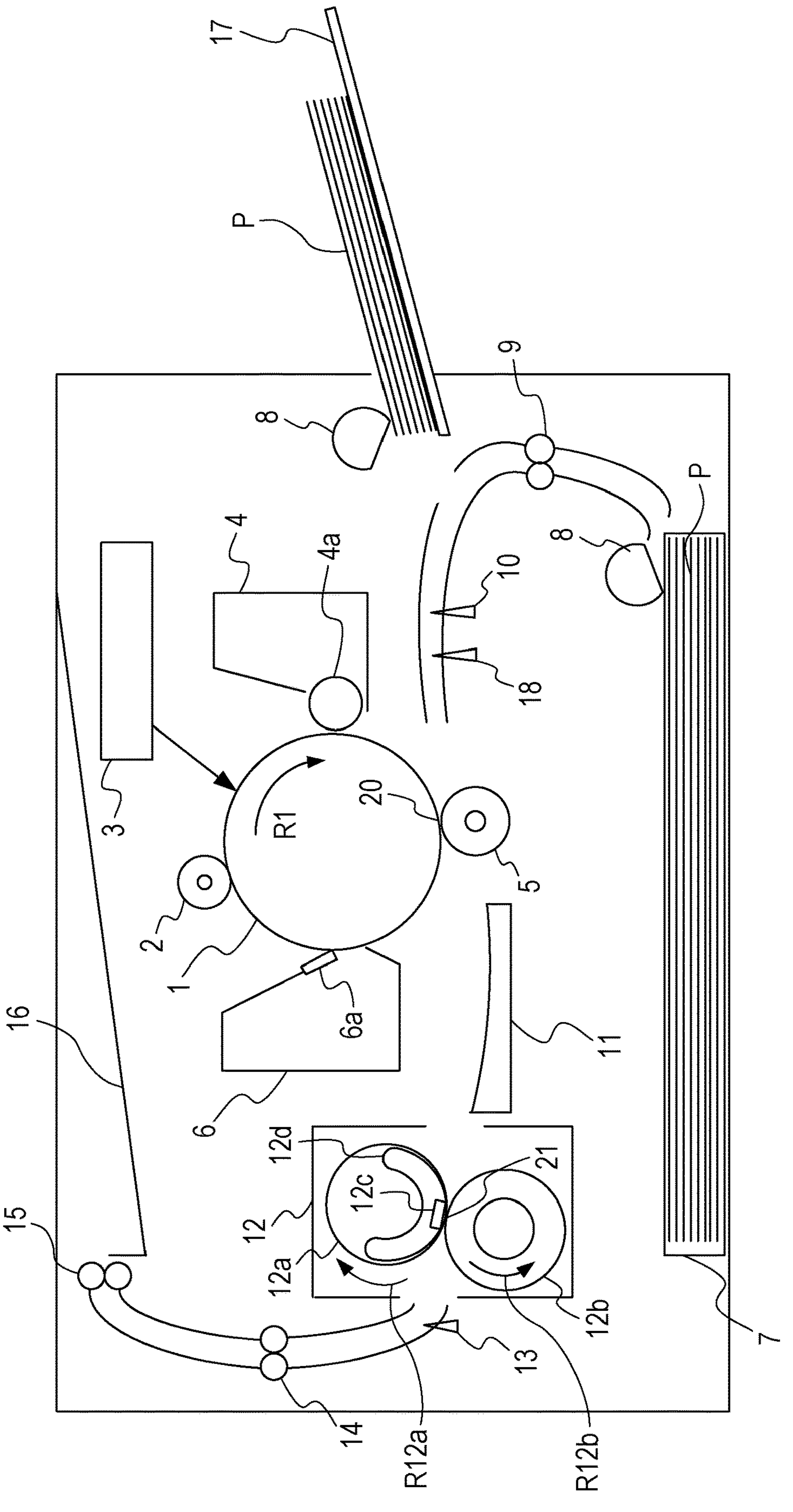
FIG. 1 is a schematic diagram illustrating an exemplary configuration of an image forming apparatus.

FIG. 1 is a schematic diagram illustrating an exemplary configuration of an image forming apparatus. The image forming apparatus according to a first embodiment is an electrophotographic laser printer. The printer has a maximum sheet-passing width that corresponds to the width of a letter-size sheet fed by short edge feeding, exhibits a processing speed of 230 mm/s, and outputs A4-size sheets at a throughput of 40 pages per minute (ppm) with a sheet-passing interval (hereinafter, also referred to as a sheet interval) of 48 mm.

The image forming apparatus includes a drum-shaped electrophotographic photosensitive member (hereinafter, also referred to as a photosensitive drum) 1, serving as an imaging bearing member. The photosensitive drum 1 includes a photosensitive material, such as organic photoconductor (OPC), amorphous selenium, or amorphous silicon, on a drum base on a cylinder made of, for example, aluminum or nickel. The photosensitive drum 1 is rotated and driven at a predetermined processing speed in the direction of an arrow R1 by a driving source (not illustrated). A charging roller 2, an exposure device 3, a developing device 4, a transfer roller 5, and a cleaning device 6 are sequentially arranged around the photosensitive drum 1 in a rotation direction of the photosensitive drum 1.

A sheet feeding cassette 7 accommodates recording materials P, such as paper sheets. The recording materials P in the sheet feeding cassette 7 have a standard size, such as A4 or B5. The image forming apparatus further includes an MP tray (hereinafter, also referred to as a manual feed tray) 17, serving as a sheet feeder, on which recording materials P different from those in the sheet feeding cassette 7 are stacked. A feeding roller 8, conveying rollers 9, a top sensor 10, a sheet width sensor 18, a conveyance guide 11, a fixing device 12, a sheet discharge sensor 13, conveying rollers 14, discharge rollers 15, and an output tray 16 are sequentially arranged along a conveyance path for the recording materials P.

An image forming operation of the image forming apparatus will now be described. The photosensitive drum 1 rotated and driven in the direction of the arrow R1 by the driving source (not illustrated) is uniformly charged with a predetermined polarity at a predetermined potential by the charging roller 2. The exposure device 3 irradiates the charged surface of the photosensitive drum 1 with a laser beam based on image data. Charge on a portion of the surface that is exposed to the laser beam is removed, thus forming an electrostatic latent image on the photosensitive drum 1. The formed electrostatic latent image is developed by the developing device 4. The developing device 4 includes a developing roller 4*a*, and applies a development bias to the developing roller 4*a* to deposit toner on the electrostatic latent image on the photosensitive drum 1 and develop a toner image (image).

The image formed on the photosensitive drum 1 is transferred to the recording material P fed from the sheet feeding cassette 7 or the manual feed tray 17 by the transfer roller 5. The transfer roller 5 is pressed in contact with the photosensitive drum 1 by a pressure spring (not illustrated) to define a transfer nip 20 together with the photosensitive drum 1.

The recording materials P are held in the sheet feeding cassette 7 and are fed one by one by the feeding roller 8. The recording material P is conveyed to the transfer nip 20 by the conveying rollers 9. At this time, the leading edge of the recording material P is detected by the top sensor 10 and is synchronized with the image formed on the photosensitive drum 1. Furthermore, the trailing edge of the recording material P is detected in addition to the leading edge thereof by the top sensor 10, so that the length of the recording material P in the conveying direction can be determined. In addition, the width of the recording material P in a direction perpendicular to the conveying direction can be determined by using the sheet width sensor 18. As will be described in detail later, the type of the recording material P can be determined based on the length and the width thereof.

A transfer bias having a polarity opposite to the toner charge polarity is applied to the transfer roller 5. The image on the photosensitive drum 1 is transferred to the recording material P. The recording material P carrying the transferred, but unfixed, image is conveyed to the fixing device 12 along the conveyance guide 11. The fixing device 12 heats and presses the recording material P to fix the image to the surface of the recording material P.

The fixing device 12 is a pressure roller driving type fixing device that includes a flexible endless belt, serving as a fixing film. The fixing device 12 includes a fixing film 12*a*, a pressure roller 12*b*, which serves as a pressure member in contact with the fixing film 12*a*, a ceramic heater (hereinafter, also referred to as a heater) 12*c*, which heats toner with the fixing film 12*a* therebetween, and a heater holder 12*d*.

The pressure roller 12*b* includes a metal core having an outer peripheral surface, a heat-resistant elastic layer made of, for example, silicone rubber, and located on the outer peripheral surface, and a release layer, serving as an uppermost surface layer, made of a highly releasable material, such as fluorocarbon resin. The pressure roller 12*b* presses, from below, the fixing film 12*a* against the heater 12*c* with a pressure spring (not illustrated) and an outer peripheral surface of the release layer, and defines a fixing nip 21 together with the fixing film 12*a*. The pressure roller 12*b* is rotated and driven in the direction of an arrow R12*b* by a driving source (not illustrated). A pressure-contact frictional force generated at the fixing nip 21 exerts a rotational force on the fixing film 12*a*, so that the fixing film 12*a* is driven and rotated in the direction of an arrow R12*a* while an internal surface of the fixing film 12*a* is sliding on the heater 12*c*.

Furthermore, power supply to the heater 12*c* raises the temperature of the fixing film 12*a* to a predetermined temperature. While the fixing film 12*a* is adjusted at the predetermined temperature, the recording material P is conveyed to the fixing nip 21. At the fixing nip 21, heat is transferred from the heater 12*c* to the recording material P through the fixing film 12*a*, so that the image on the recording material P is fixed to the recording material P. The recording material P leaving the fixing nip 21 is curvature-separated from the fixing film 12*a*.

The recording material P with the fixed image is conveyed by the conveying rollers 14 and is then discharged onto the output tray 16 by the discharge rollers 15. Residual toner, which has not been transferred to the recording material P, remaining on the photosensitive drum 1 subjected to transfer of the image to the recording material P is removed by a cleaning blade 6*a* of the cleaning device 6.

Relationship Between Recording Material P and Sheet Interval

Figure 2:
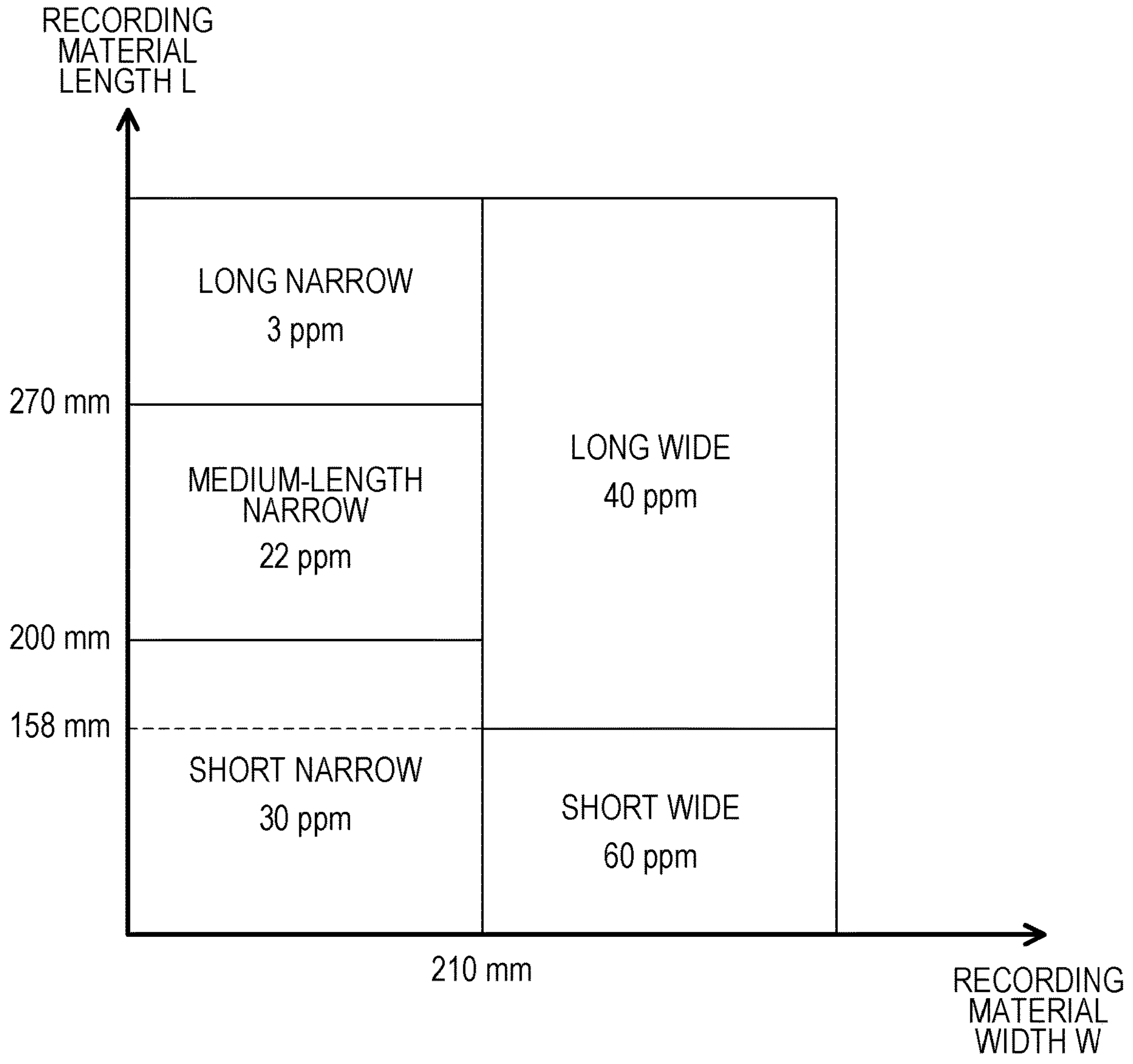
FIG. 2 is a diagram illustrating types of recording materials P based on lengths and widths of the recording materials.
Figure 3:
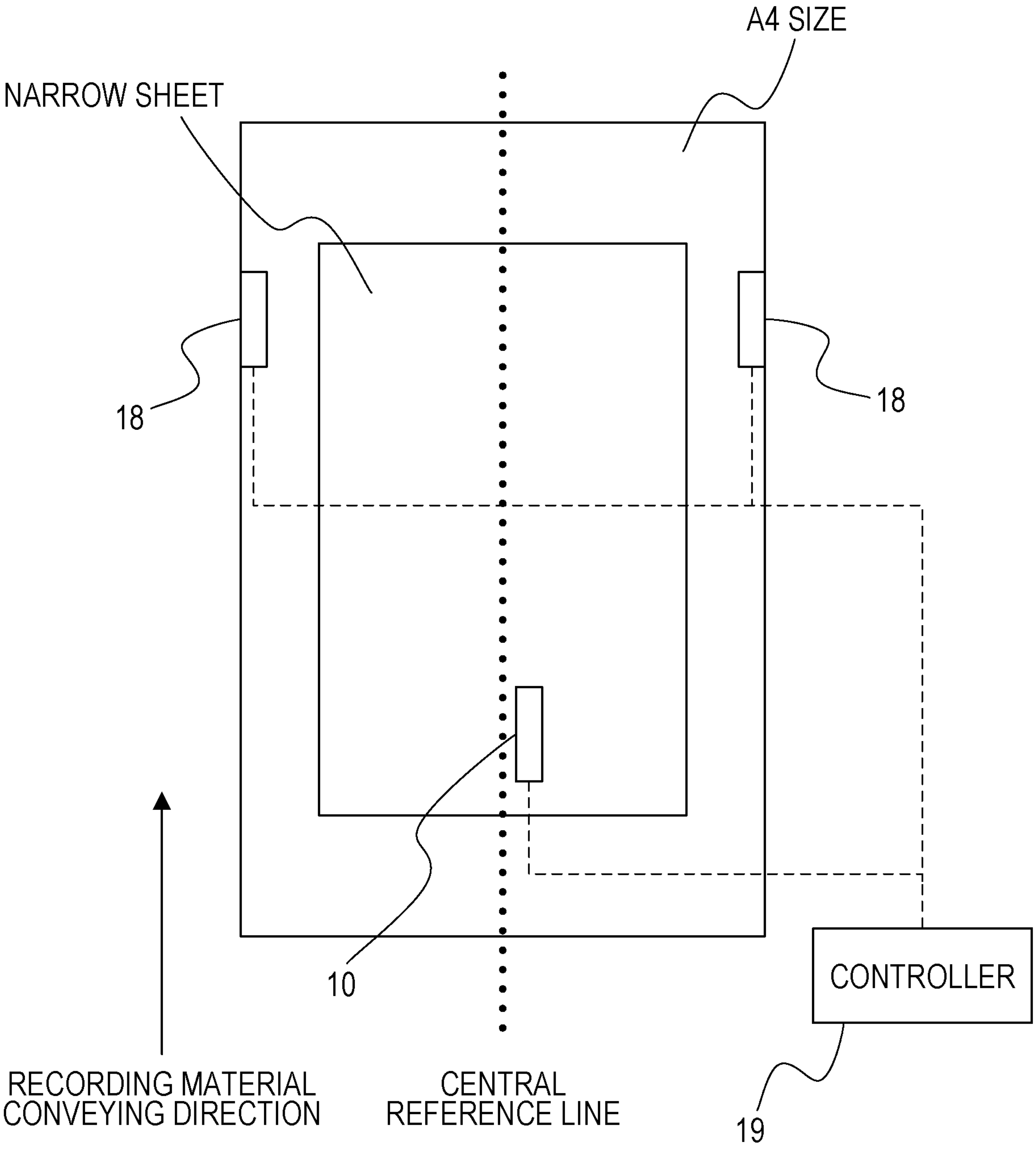
FIG. 3 is a diagram illustrating a sensor that detects the length of a recording material P and a sensor that detects the width of the recording material P.

The recording materials P and sheet intervals will now be described with reference to FIGS. 2 and 3 and Table 1. FIG. 2 is a diagram illustrating the types of recording materials P based on lengths and widths of the recording materials. FIG. 3 is a diagram illustrating the sensors detecting the length and width of the recording material P. Table 1 illustrates the types of the recording materials P and the sheet intervals. FIG. 3 illustrates a controller 19, serving as a control unit. The controller 19, which includes a central processing unit (CPU) and a memory, controls detection of the length and width of the recording material P and adjusts a sheet interval depending on the type of the recording material P.

The controller 19 adjusts the sheet interval depending on the type of a recording material. Adjusting the sheet interval determines productivity per unit time (also referred to as throughput). The term "feeding interval" as used herein refers to an interval between the time when the feeding roller 8 starts rotation to feed a preceding first recording material P and the time when the feeding roller 8 starts rotation to feed a succeeding second recording material P following the first recording material P.

Detection of the length and width of a recording material P will now be described with reference to FIG. 3. The controller 19 determines the length and width of a recording material P based on values detected by the top sensor 10, serving as a first sensor, and the sheet width sensor 18, serving as a second sensor. In the configuration in the present embodiment, the recording material P is conveyed with its centerline aligned with a central reference line. The top sensor 10 is disposed in proximity to the central reference line. The sheet width sensor 18 includes elements disposed 102 mm from the central reference line and located to the left and right of the central reference line. Disposing the sheet width sensor 18 at such a location enables a determination as to whether the width of a recording material P to be detected is smaller than the A4 size.

a recording material P having a wide width and a length of 158 mm or more is referred to as a long wide sheet, a recording material P having a narrow width and a length less than 200 mm is referred to as a short narrow sheet, a recording material P having a narrow width and a length that is greater than or equal to 200 mm and less than 270 mm is referred to as a medium-length narrow sheet, and a recording material P having a narrow width and a length of 270 mm or more is referred to as a long narrow sheet. This embodiment illustrates an exemplary method of adjusting the sheet interval depending on the type of a recording material determined based on the width and length of the recording material. The manner of adjustment is not limited to this example. For example, the sheet interval can be adjusted based on values of the width and length of a recording material instead of the type of the recording material.

The controller 19 adjusts the sheet interval depending on the type of a recording material P, as illustrated in Table 1.

The type of a recording material P may be determined based on the width and length of the recording material P or may be designated by a user input. A minimum sheet interval illustrated in Table 1 is determined based on, for example, a maximum length of a recording material P of each type. For more detailed adjustment, the sheet interval may vary depending on the length of a recording material P. For example, for a long wide sheet that is a recording material P having a length of 297 mm, the feeding interval is 1.5 s, the throughput is 40 ppm, and the sheet interval is 48 mm. Similarly, for a long narrow sheet that is a recording material P having a length of 297 mm, the feeding interval is 20.0 s, the throughput is 3 ppm, and the sheet interval is 4303 mm.

TABLE 1

| | Recording Material Width W [mm] | Recording Material Length L [mm] | Processing Speed [mm/s] | Feeding Interval [s] | Minimum Sheet Interval [mm] | Throughput [ppm] |
|---|---|---|---|---|---|---|
| Long Narrow | W < 210 | 270 ≤ L ≤ 297 | 230 | 20.0 | 4303 | 3 |
| Medium-Length Narrow | | 200 ≤ L < 270 | 230 | 2.7 | 357 | 22 |
| Short Narrow | | L < 200 | 230 | 2.0 | 260 | 30 |
| Long Wide | 210 ≤ W | 158 ≤ L ≤ 297 | 230 | 1.5 | 48 | 40 |
| Short Wide | | L < 158 | 230 | 1.0 | 72 | 60 |

In response to a determination of whether a recording material P is detected by the sheet width sensor 18, the controller 19 can determine whether the recording material P is narrow or wide in a direction along the width of the recording material. If a recording material P is detected by the sheet width sensor 18, the controller 19 determines that the recording material P has a wide width (wide sheet). If a recording material P is not detected by the sheet width sensor 18, the controller 19 determines that the recording material P has a narrow width (narrow sheet).

Figure 4:
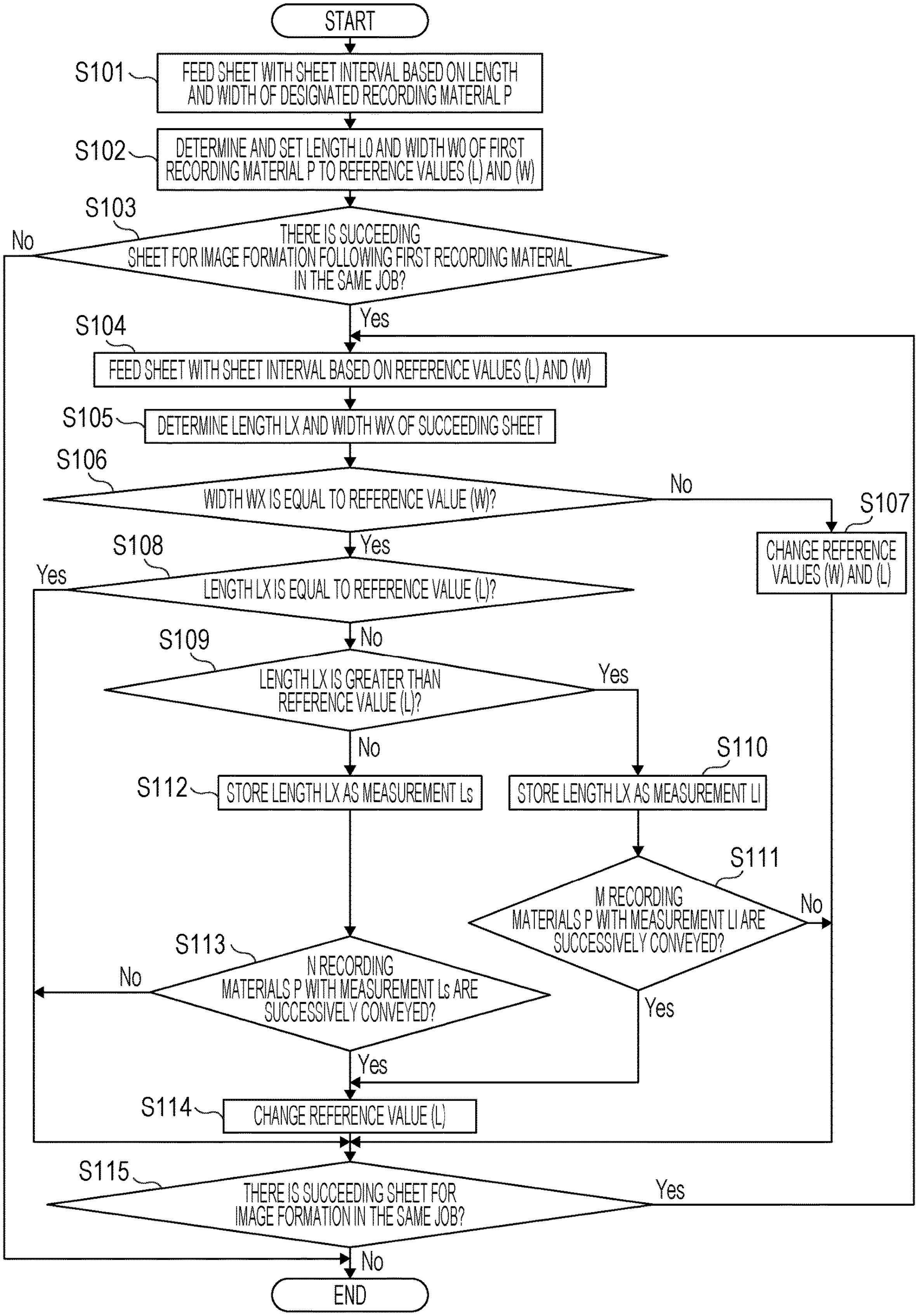
FIG. 4 is a flowchart illustrating sheet interval adjustment that depends on the type of a recording material P.

Furthermore, the controller 19 determines the length of the recording material P based on a duration during which the recording material P is detected by the top sensor 10 and a conveyance speed. The controller 19 then determines a type of the recording material P based on the length and width of the recording material P, as illustrated in FIG. 2. Specifically, a recording material P having a wide width and a length less than 158 mm is referred to as a short wide sheet, FIG. 4 is a flowchart illustrating sheet interval adjustment that depends on the type of a recording material P in the embodiment. In S101, in response to receiving a print command for feeding recording materials P from the manual feed tray 17, the controller 19 feeds a recording material P with a sheet interval based on the length and width of the recording material P designated by the user for image formation. In S102, the controller 19 determines a length L0 and a width WO of the first fed recording material P by using the sheet width sensor 18 and the top sensor 10. The determined length L0 is set to a reference value (L), and the determined width WO is set to a reference value (W). Thus, the sheet interval for the first and subsequent recording materials P is controlled based on the set reference values.

In S103, the controller 19 determines whether there is a succeeding sheet for image formation following the first recording material P in the same job. If there is no succeeding sheet, the process is terminated. If there is a succeeding sheet, the controller 19 feeds the succeeding sheet with the sheet interval based on the set reference values in S104. In the embodiment, as illustrated in Table 1 described above as an example, the recording materials P are classified into five types based on width reference values (W) and length reference values (L), and sheet intervals suitable for the respective types are set. For example, a sheet interval for a long narrow sheet is set to 4303 mm, and a sheet interval for a long wide sheet is set to 48 mm. In S105, the controller 19 determines a length LX and a width WX of the Xth succeeding sheet in a manner similar to the first recording material P.

In S106, the controller 19 determines whether the determined width WX is equal to the reference value (W). If the width WX is not equal to the reference value, the controller 19 changes the reference value (W) to the determined width WX in S107. Additionally, the controller 19 changes the reference value (L) to the determined length LX.

If the width WX is equal to the reference value (W), the controller 19 determines, in S108, whether the determined length LX is equal to the reference value (L). If the length LX is equal to the reference value, the process proceeds to S115. If the length LX is not equal to the reference value (L), the controller 19 determines, in S109, whether the determined length LX is greater than the reference value (L). If the length LX is greater than the reference value, the controller 19 stores the determined length LX as a measurement L1 in the memory in S110. Furthermore, the controller 19 determines, in S111, whether M recording materials P having a length represented by the measurement L1 are successively conveyed. If M recording materials having such a length are not successively conveyed, the controller 19 does not change the reference value (L). If M recording materials having the above-described length are successively conveyed, the process proceeds to S114.

If the determined length LX is less than the reference value (L), the controller 19 stores the determined length LX as a measurement Ls in the memory in S112. Furthermore, the controller 19 determines, in S113, whether N recording materials P having a length represented by the measurement Ls are successively conveyed. If N recording materials having such a length are not successively conveyed, the controller 19 does not change the reference value (L). If N recording materials having the above-described length are successively conveyed, the process proceeds to S114.

In S114, the controller 19 changes the reference value (L). In S115, the controller 19 determines whether there is still another succeeding sheet for image formation in the same job. If there is no succeeding sheet, the process is terminated. If there is still another succeeding sheet, the process is returned to S104 and is continued.

The relationship between the value M in S111 and the value N in S113 described above will now be described. It is assumed herein that the length LX of the succeeding sheet is greater than the reference value (L). If image formation is continued with the sheet interval based on the reference value (L), the sheet interval may be shorter than a sheet interval required to inhibit a temperature rise in a non-sheet-passing portion, causing a temperature rise in the non-sheet-passing portion. Therefore, the value M can be minimized and set so that the sheet interval can be changed based on the length LX as soon as possible. In the embodiment, for example, M=1. Even if only one recording material P having a length greater than the reference value (L) is conveyed, the reference value (L) can be changed. In S104, a sheet interval can be set based on the changed reference value (L).

In contrast, if the length LX of the succeeding sheet is less than the reference value (L), whether N recording materials P having the same length are successively conveyed is determined. For example, it is assumed that N is set to 1 in a manner similar to the case where the length LX is greater than the reference value and that the reference value (L) is changed in response to conveyance of a recording material P having a length less than the reference value (L). In this case, a sheet interval set based on the changed reference value (L) may be unsuitable for a length of the succeeding conveyed recording material P.

Specifically, for example, in spite of the fact that long narrow sheets are stacked on the manual feed tray 17, a slip between the recording material P and the conveying rollers or variations in detection by the sensors may cause the recording material P to be determined as a medium-length narrow sheet based on the length LX of the succeeding sheet. In this case, the sheet interval may be changed based on the changed reference value (L) corresponding to a medium-length narrow sheet. Although a sheet interval of 4303 mm has to be set because the succeeding sheet is also a long narrow sheet, a sheet interval of 357 mm may be set.

In particular, in a case where a large number of long narrow sheets have successively passed through the image forming apparatus, the non-sheet-passing portion may be at a high temperature. A reduction in sheet interval may cause an issue resulting from a temperature rise in the non-sheet-passing portion. Therefore, the value N is set greater than the value M. In response to a determination that N recording materials P having a length equal to the measurement Ls are successively conveyed, control is performed to change the reference value (L) and change the sheet interval.

The above-described manner of setting the values M and N allows N recording materials P to be conveyed before the sheet interval is changed if the non-sheet-passing portion is at a high temperature due to successive passing of long narrow sheets. This can reduce a temperature rise in the non-sheet-passing portion. In addition, measuring the lengths of N succeeding sheets enables accurate detection of a recording material P having a length less than the reference value (L) and being conveyed. In the embodiment, for example, N is set to 5 so that M<N. When five recording materials P having a length less than the reference value (L) are successively conveyed, the reference value (L) is changed. Thus, the subsequent recording materials P can be conveyed with a sheet interval based on the changed reference value (L). Therefore, if a recording material P is wrongly detected, a temperature rise in the non-sheet-passing portion can be suppressed. For example, if long narrow sheets and medium-length narrow sheets are mixed and stacked, a temperature rise in the non-sheet-passing portion can be inhibited. The above-described values M and N are merely examples. The values M and N can be set such that M<N in consideration of parameters to be appropriately obtained to inhibit, for example, a temperature rise in the non-sheet-passing portion and a reduction in productivity.

As described above, the length and width of the preceding sheet are compared with those of the succeeding sheet. If the sheets have the same width and different lengths and the succeeding sheet is longer than the preceding sheet, control is performed to change the reference value in response to M sheets having the same length and conveyed successively. If the sheets have the same width and different lengths and the succeeding sheet is shorter than the preceding sheet, control is performed to change the reference value in response to N sheets having the same length and conveyed successively. In addition, control is performed to set a sheet interval suitable for the type of recording materials based on the changed reference value. In this case, the values M and N, each indicating the number of sheets, are set to satisfy M<N. Thus, if recording materials P having different widths or lengths are conveyed for one job, a sheet interval suitable for a recording material P can be set. This can inhibit a temperature rise in the non-sheet-passing portion. Inhibiting a temperature rise in the non-sheet-passing portion can inhibit the likelihood of deterioration of rubber of the pressure roller and paper wrinkles. Additionally, since the sheet interval can be changed to a value suitable for the width or length of a recording material P, a reduction in productivity caused by an unnecessary increase in sheet interval can also be inhibited.

In the above-described exemplary flowchart of FIG. 4, the determined width WX and length LX of a recording material P are compared with the reference values. The embodiment is not limited to this example. For example, a margin may be provided in consideration of a slip between a recording material P and the conveying rollers and variations in detection by the sensors. Specifically, for example, in S108, the controller 19 may determine whether the determined length LX is 10 mm or more greater than the reference value (L). Furthermore, in S111, the controller 19 may determine whether M recording materials P having a length of the measurement L1±5 mm are successively conveyed. The above-described numerical values are merely examples. Any values may be set as appropriate based on, for example, the configuration of the image forming apparatus.

In the above example described in the embodiment, different recording materials P are fed from the single manual feed tray 17. The embodiment is not limited to this example. For example, in an image forming apparatus having multiple manual feed trays, the sheet interval adjustment in the embodiment can be performed even if recording materials P are sequentially fed from two or more manual feed trays. In this case, the width and length of the preceding sheet are compared with those of the succeeding sheet. If the sheets have the same width and different lengths and the succeeding sheet is longer than the preceding sheet, control is performed to change the reference value in response to M recording materials having the same length and conveyed successively. If the sheets have the same width and different lengths and the succeeding sheet is shorter than the preceding sheet, control is performed to change the reference value in response to N recording materials having the same length and conveyed successively. Furthermore, control is performed to set a sheet interval suitable for the type of recording materials based on the changed reference value. In this case, the values M and N each indicating the number of sheets may be set to satisfy M<N.

Second Embodiment

In the example described below in a second embodiment, the number of sheets on which a reference value is changed based is changed depending on the length of a recording material P. The same reference sign is assigned to the same component as that in the image forming apparatus according to the foregoing first embodiment without duplicated explanation.

A medium-length narrow sheet and a short narrow sheet, serving as recording materials P, each have a length shorter than that of a long narrow sheet and thus pass through the fixing device 12 for a shorter time period. A temperature rise in the non-sheet-passing portion caused by a medium-length narrow sheet or a short narrow sheet tends to be smaller than that caused by a long narrow sheet. It is assumed herein that a set reference value (L) is less than a length corresponding to a long narrow sheet and the length LX of the succeeding recording material P is less than the reference value (L). In such a case, the reference value (L) can be changed based on a smaller number of sheets than N sheets set in FIG. 4 in the foregoing first embodiment. This further inhibits a reduction in throughput.

Figure 5:
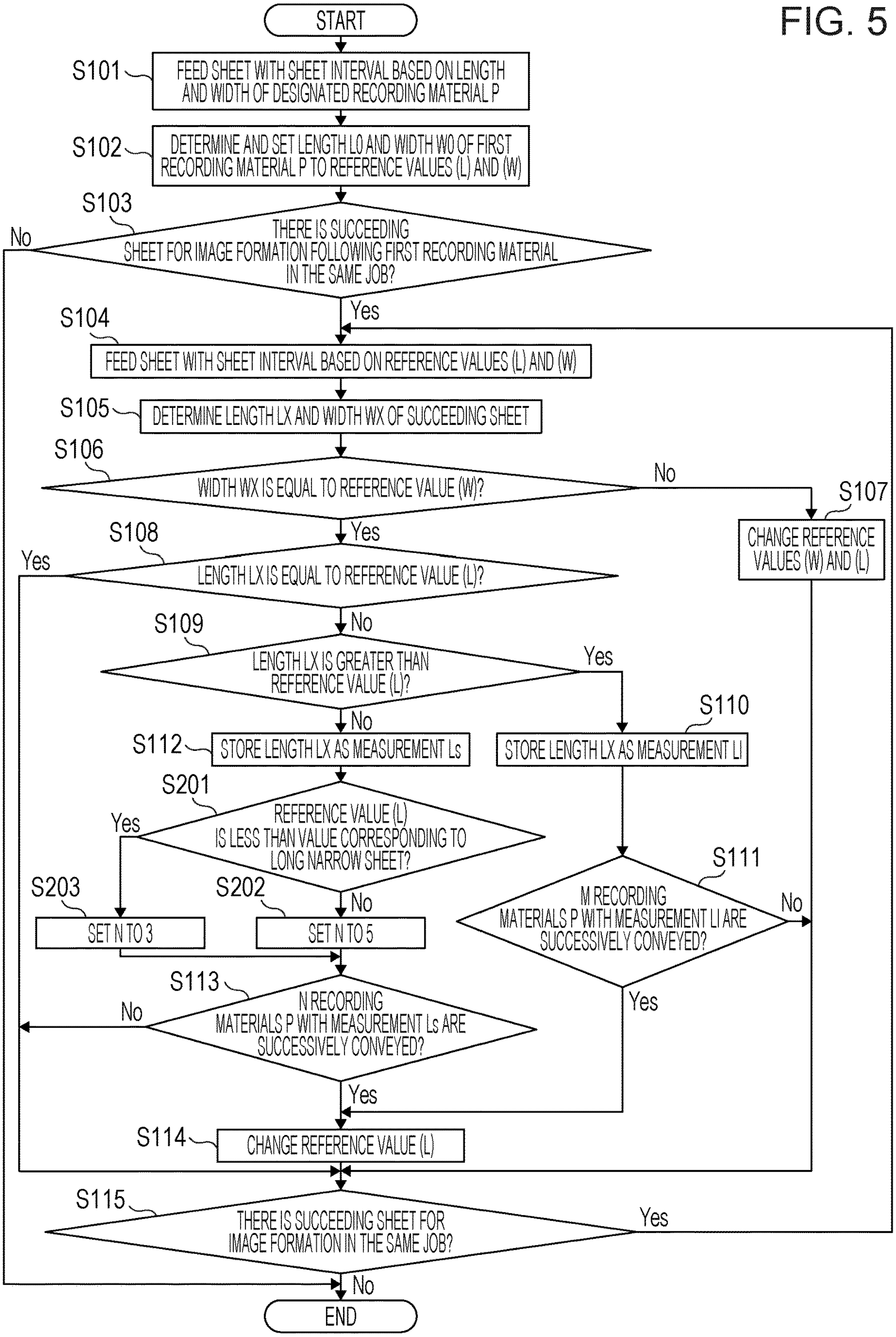
FIG. 5 is a flowchart illustrating sheet interval adjustment that depends on the type of a recording material P.

FIG. 5 is a flowchart illustrating sheet interval adjustment that depends on the type of a recording material P in the present embodiment. The same reference sign is assigned to the same step as that in FIG. 4 in the foregoing first embodiment without duplicated explanation.

If the determined length LX is less than the reference value (L), the controller 19 stores the determined length LX as the measurement Ls in the memory in S112. In S201, the controller 19 determines whether the reference value (L) is less than a length corresponding to a long narrow sheet. If the reference value (L) is not less than the length corresponding to a long narrow sheet, the controller 19 sets N to 5 in S202 as in the foregoing first embodiment. If the reference value (L) is less than the length corresponding to a long narrow sheet, the controller 19 sets N to 3, which is a value less than N in S202, in S203. The reason is as follow. For example, if the reference value (L) indicates a length corresponding to a medium-length narrow sheet, a temperature rise in the non-sheet-passing portion caused by successive passing of medium-length narrow sheets is smaller than that of long narrow sheets. Therefore, the number of sheets on which the sheet interval is changed based can be set smaller. Thus, a determination to reduce the sheet interval can be made based on a smaller number of sheets. This inhibits a reduction in productivity, thus improving throughput.

In a case where the length LX of the succeeding sheet differs from the reference value (L) as described above, the value N, which is a threshold that is used to determine whether sheets are successively conveyed, is set based on the reference value (L). Thus, the reference value (L) can be changed at appropriate timing that depends on the reference value (L). Since a determination to reduce the sheet interval can be made based on a smaller number of sheets that depends on the reference value (L), a reduction in productivity can be inhibited, leading to improved throughput.

Third Embodiment

In the example described below in a third embodiment, the number of sheets on which the reference value is changed based is changed depending on a temperature detected by an environment sensor disposed in an image forming apparatus. The same reference sign is assigned to the same component as that in the image forming apparatus according to the foregoing first embodiment without duplicated explanation.

The image forming apparatus is designed to be used in a variety of environments. A target temperature (for temperature adjustment) of the heater 12*c* is set to satisfy the fixability of toner to a recording material P in a range of possible ambient temperatures. Particularly, in a low-temperature environment at an ambient temperature of 15° C. or lower, a recording material P to pass through the image forming apparatus has a low temperature and requires a larger quantity of heat for fixing than in an ordinary temperature environment at an ambient temperature of 23° C. In other words, the target temperature is set low in an ordinary temperature environment where the target temperature can be set relatively low. This inhibits a temperature rise in the non-sheet-passing portion. In the ordinary temperature environment, therefore, if the length LX of the succeeding recording material P is less than the reference value (L), the reference value (L) can be changed based on a smaller number of sheets than N sheets set in FIG. 4 in the foregoing first embodiment. This further inhibits a reduction in throughput.

Figure 6:
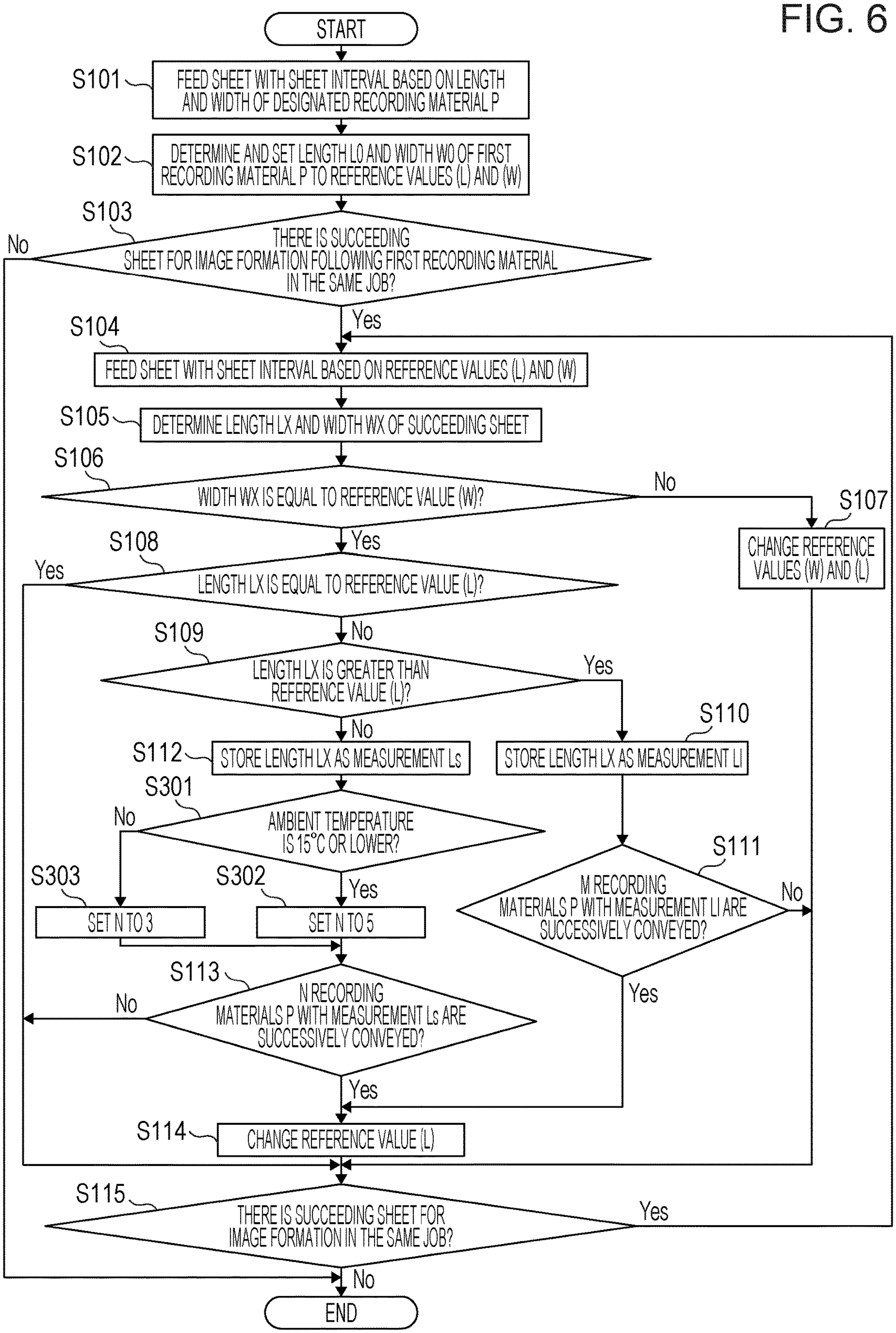
FIG. 6 is a flowchart illustrating sheet interval adjustment that depends on the type of a recording material P and an ambient temperature.

FIG. 6 is a flowchart illustrating sheet interval adjustment that depends on the type of a recording material P and an ambient temperature in this embodiment. The same reference sign is assigned to the same step as that in FIG. 4 in the foregoing first embodiment without duplicated explanation.

If the determined length LX is less than the reference value (L), the controller 19 stores the determined length LX as the measurement Ls in the memory in S112. In S301, the controller 19 determines whether an ambient temperature detected by the environment sensor is 15° C. or lower. If the ambient temperature is 15° C. or lower, it means that the target temperature is set relatively high. In S302, the controller 19 sets N to 5 as in the foregoing first embodiment. If the ambient temperature is higher than 15° C., the controller 19 sets N to 3, which is a value smaller than N in S302, in S303. The reason is as follows. Setting a relatively low target temperature in the ordinary temperature environment can inhibit a temperature rise in the non-sheet-passing portion. The number of sheets on which the sheet interval is changed based can also be set small. Thus, a determination to reduce the sheet interval can be made based on a smaller number of sheets. This inhibits a reduction in productivity, thus improving throughput.

In the case where the length LX of the succeeding sheet differs from the reference value (L) as described above, the value N, which is a threshold that is used to determine whether sheets are successively conveyed, is set based on an ambient temperature. Thus, the reference value (L) can be changed at appropriate timing that depends on an ambient temperature. Since a determination to reduce the sheet interval can be made based on a smaller number of sheets that depends on the reference value (L), a reduction in productivity can be inhibited, leading to improved throughput.

Embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described Embodiments and/or that includes one or more circuits (e.g., application specific integrated circuit (ASIC)) for performing the functions of one or more of the above-described Embodiments, and by a method performed by the computer of the system or apparatus by, for example, reading out and executing the computer executable instructions from the storage medium to perform the functions of one or more of the above-described Embodiments and/or controlling the one or more circuits to perform the functions of one or more of the above-described Embodiments. The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read-only memory (ROM), a storage of distributed computing systems, an optical disk (such as a compact disc (CD), digital versatile disc (DVD), or Blu-ray Disc™ (BD)), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-163766, filed Oct. 12, 2022, which is hereby incorporated by reference herein in its entirety.

What is claimed is:

1. An image forming apparatus comprising:

a feed tray on which recording materials are to be stacked and from which the stacked recording materials are to be fed;

a first sensor configured to detect a length of a recording material fed from the feed tray in a conveying direction;

a second sensor configured to detect a width of the fed recording material in a direction perpendicular to the conveying direction; and a controller configured to perform control to adjust a sheet interval based on the detected length and width, wherein the sheet interval is a distance between a first recording material and a second recording material and the first recording material precedes the second recording material and the second recording material succeeds the first recording material, wherein, when the first recording material has a first length and the second recording material has a second length longer than the first length, the controller performs control to increase the sheet interval in response to a first number of recording materials having the second length and conveyed successively, and wherein, when the first recording material has the first length and the second recording material has a third length shorter than the first length, the controller performs control to reduce the sheet interval in response to a second number of recording materials having the third length and conveyed successively, where the second number is greater than the first number.

2. The image forming apparatus according to claim 1, wherein, when the first recording material has a fourth length shorter than the first length and the second recording material has a fifth length shorter than the fourth length, the controller performs control to reduce the sheet interval in response to a third number of recording materials having the fifth length and conveyed successively, where the third number is less than the second number.

3. The image forming apparatus according to claim 1, further comprising:

a third sensor configured to detect a temperature of an environment where the image forming apparatus is disposed, wherein, when the first recording material has the first length, the second recording material has the third length, and the environment has a first temperature, the controller performs control to reduce the sheet interval in response to the second number of recording materials having the third length and conveyed successively, and wherein, when the first recording material has the first length, the second recording material has the third length, and the environment has a second temperature higher than the first temperature, the controller performs control to reduce the sheet interval in response to a third number of recording materials having the third length and conveyed successively, where the third number is less than the second number.

4. The image forming apparatus according to claim 1, wherein, when the first recording material has the first length and the second recording material has the second length longer than the first length, the controller changes a reference value from the first length to the second length in response to the first number of recording materials having the second length and conveyed successively.

5. The image forming apparatus according to claim 1, wherein, when the first recording material has the first length and the second recording material has the third length shorter than the first length, the controller changes a reference value from the first length to the third length in response to the second number of recording materials having the third length and conveyed successively.

6. The image forming apparatus according to claim 1, wherein the controller determines, based on the detected length and width, a type of the recording material, and adjusts the sheet interval depending on the determined type of the recording material.

7. A method for an image forming apparatus having a feed tray on which recording materials are to be stacked and from which the stacked recording materials are to be fed, a first sensor, and a second sensor, the method comprising:

detecting, via the first sensor, a length of a recording material fed from the feed tray in a conveying direction;

detecting, via the second sensor, a width of the fed recording material in a direction perpendicular to the conveying direction; and performing control to adjust a sheet interval based on the detected length and width, wherein the sheet interval is a distance between a first recording material and a second recording material and the first recording material precedes the second recording material and the second recording material succeeds the first recording material, wherein, when the first recording material has a first length and the second recording material has a second length longer than the first length, performing control includes performing control to increase the sheet interval in response to a first number of recording materials having the second length and conveyed successively, and wherein, when the first recording material has the first length and the second recording material has a third length shorter than the first length, performing control includes performing control to reduce the sheet interval in response to a second number of recording materials having the third length and conveyed successively, where the second number is greater than the first number.

8. The method according to claim 7, wherein, when the first recording material has a fourth length shorter than the first length and the second recording material has a fifth length shorter than the fourth length, performing control includes performing control to reduce the sheet interval in response to a third number of recording materials having the fifth length and conveyed successively, where the third number is less than the second number.

9. The method according to claim 7, wherein the image forming apparatus further comprises a third sensor configured to detect a temperature of an environment where the image forming apparatus is disposed, wherein, when the first recording material has the first length, the second recording material has the third length, and the environment has a first temperature, performing control includes performing control to reduce the sheet interval in response to the second number of recording materials having the third length and conveyed successively, and wherein, when the first recording material has the first length, the second recording material has the third length, and the environment has a second temperature higher than the first temperature, performing control includes performing control to reduce the sheet interval in response to a third number of recording materials having the third length and conveyed successively, where the third number is less than the second number.

10. The method according to claim 7, wherein, when the first recording material has the first length and the second recording material has the second length longer than the first length, performing control includes changing a reference value from the first length to the second length in response to the first number of recording materials having the second length and conveyed successively.

11. The method according to claim 7, wherein, when the first recording material has the first length and the second recording material has the third length shorter than the first length, performing control includes changing a reference value from the first length to the third length in response to the second number of recording materials having the third length and conveyed successively.

12. The method according to claim 7, wherein performing control includes determining, based on the detected length and width, a type of the recording material, and adjusting the sheet interval depending on the determined type of the recording material.

13. A non-transitory computer-readable storage medium storing a program to cause a computer to perform a method for an image forming apparatus having a feed tray on which recording materials are to be stacked and from which the stacked recording materials are to be fed, a first sensor, and a second sensor, the method comprising:

detecting, via the first sensor, a length of a recording material fed from the feed tray in a conveying direction;

detecting, via the second sensor, a width of the fed recording material in a direction perpendicular to the conveying direction; and performing control to adjust a sheet interval based on the detected length and width, wherein the sheet interval is a distance between a first recording material and a second recording material and the first recording material precedes the second recording material and the second recording material succeeds the first recording material, wherein, when the first recording material has a first length and the second recording material has a second length longer than the first length, performing control includes performing control to increase the sheet interval in response to a first number of recording materials having the second length and conveyed successively, and wherein, when the first recording material has the first length and the second recording material has a third length shorter than the first length, performing control includes performing control to reduce the sheet interval in response to a second number of recording materials having the third length and conveyed successively, where the second number is greater than the first number.

* * * * *